United States Patent

Chiang et al.

Patent Number: 6,034,669
Date of Patent: Mar. 7, 2000

[54] JOYSTICK CONTROL DEVICE HAVING CURSOR CORRECTING FUNCTION

[75] Inventors: Ting-Chi Chiang; Fu-Yuan Cheng; Huai-Yi Chen, all of Hsinchu, Taiwan

[73] Assignees: Realtek Semiconductor Corp., Hsinchu; Tigerex Enterprise Co., Ltd., Taipei, both of Taiwan

[21] Appl. No.: 09/022,839

[22] Filed: Feb. 12, 1998

[51] Int. Cl.[7] ...................................................... G09G 5/08
[52] U.S. Cl. .......................... 345/161; 345/157; 345/162
[58] Field of Search ..................................... 345/156, 157, 345/160, 161, 162, 163

[56] References Cited

U.S. PATENT DOCUMENTS

| | | | |
|---|---|---|---|
| 5,510,811 | 4/1996 | Tobey et al. ............................. | 345/160 |
| 5,724,068 | 3/1998 | Sanchez et al. ......................... | 345/161 |
| 5,731,800 | 3/1998 | Harrow et al. .......................... | 345/162 |
| 5,748,180 | 5/1998 | Inukai ..................................... | 345/161 |

*Primary Examiner*—Vijay Shankar
*Attorney, Agent, or Firm*—Bacon & Thomas, PLLC

[57] ABSTRACT

A joystick control device having cursor correcting function, in which the conventional adjustable resistor is replaced by a photoelectric element for detecting the movement of the joystick, thereby eliminates the ill effects caused by mechanical attrition of resistor. Additionally, the parameter drifts caused by IC manufacturing processes are corrected using shift correction of joystick; therefore, every individual mass-produced IC shows similar good behavior.

6 Claims, 6 Drawing Sheets

JOYSTICK CONTROL DEVICE HAVING CURSOR CORRECTING FUNCTION

BACKGROUND OF THE INVENTION

1. Field of the Invention

The present invention relates to a joystick control device having cursor correcting function.

2. Description of the Related Art

For a conventional joystick control device, movement of the joystick is typically detected by the adjustable resister of its input terminal and, after internal processing, the position of cursor on a screen is determined according to the outputted resistance. These conventional joystick control devices are disadvantage in that the resistance of the adjustable resistor changes or the resistor breaks after long time usage, with the result that the cursor does not sit at the central point of the screen as the joystick stays at its central position, and that an additional microadjuster for compensation is necessary.

Besides, the desired circuit characters of a conventional joystick control device may not be obtained because of the parameter drift and variation caused by the manufacturing processes; therefore, the cursor positions on a screen for the mass-produced joystick control devices are not congruous.

SUMMARY OF THE INVENTION

Accordingly, the object of the present invention is to provide a joystick control device having cursor correcting function wherein the conventional adjustable resistor is replaced by a photoelectric element for detecting the movement of the joystick, thereby eliminates the ill effects caused by mechanical attrition of the adjustable resistor. Additionally, the circuit parameter drifts caused by IC manufacturing processes can be easily corrected by the correction function of joystick; therefore, every individual mass-produced IC has the same superior performance.

The joystick control device having cursor correcting function according to the present invention includes:

- a photoelectric transducer, connecting to the joystick for transforming the light signal corresponding to the movement of the joystick to an one-byte electrical digital signal;
- a counter, connecting to the photoelectric transducer for transforming the digital signal (coming from the photoelectric transducer) to a bit sequence, wherein the bit sequence represents the movement of the joystick;
- a latch, having an initial value therein and connecting to a feedback signal and a control signal CAL, and then determining whether or not the feedback signal is inputted to replace the prior initial value according to the control signal CAL;
- an adder, receiving the output signals from the counter and the latch, adding these two signals, and outputting the result; and
- a cursor position indicator, receiving the output signal from the adder and determining the parameter which is used for determining the position of the cursor according to said output signal.

Before the following description of the present invention, it is to be understood that the center of a screen described hereinafter represents the origin of a cursor. In other words, a cursor staying at the center of a screen means that the outputted parameters of its corresponding joystick are all zero. In other words, as the joystick is centered, the cursor should be at the center of the screen.

Because of the manufacturing variation or other influences, the circuit of a joystick device includes an internal circuit parameter drift (e.g. N,); the parameter drift N is assumed to act on the cursor position indicator for simplifying the description hereinafter. Therefore, a correction parameter $-N$ is stored in the latch for compensating. When an operation parameter X is inputted from the joystick, the adder outputs a parameter $(X+(-N))$ to the cursor position indicator, and the output parameter outputted from the cursor position indicator is $(X+N+(-N))$, that is, X, which is identical to the inputted value. However, as the characters of the joystick control device changes after long time usage, the internal parameter drift changes from N to M, and the corresponding output parameter of an operation parameter X has an incorrect value $(X+M+(-N))$. Accordingly, resetting the correction parameter inside the latch becomes necessary. At this time, the cursor reflecting the output parameter is centered by moving the joystick. The output value equals to zero, that is, $(X+M+(-N))=0$ and $(X+(-N))=(-M)$, in which $(X+(-N))$ is the parameter outputted from the adder. This $(X+(-N))$ is inputted into the latch as a feedback signal of the adder to replace the prior correction parameter $(-N)$ in accordance with the control signal CAL, and the new correction parameter is $(-M)$ (since $(X+(-N))=(-M)$). After this reset operation, the corresponding output parameter of an operation parameter X has a correct value $(X+M+(-M))=X$.

According to the present invention, the circuit parameter drift can be easily corrected whenever the circuit characters of a joystick control device changed, thereby ensures that the corresponding output parameter of a joystick operation is correct.

DESCRIPTION OF THE PREFERRED EMBODIMENT(S)

Figure 1:
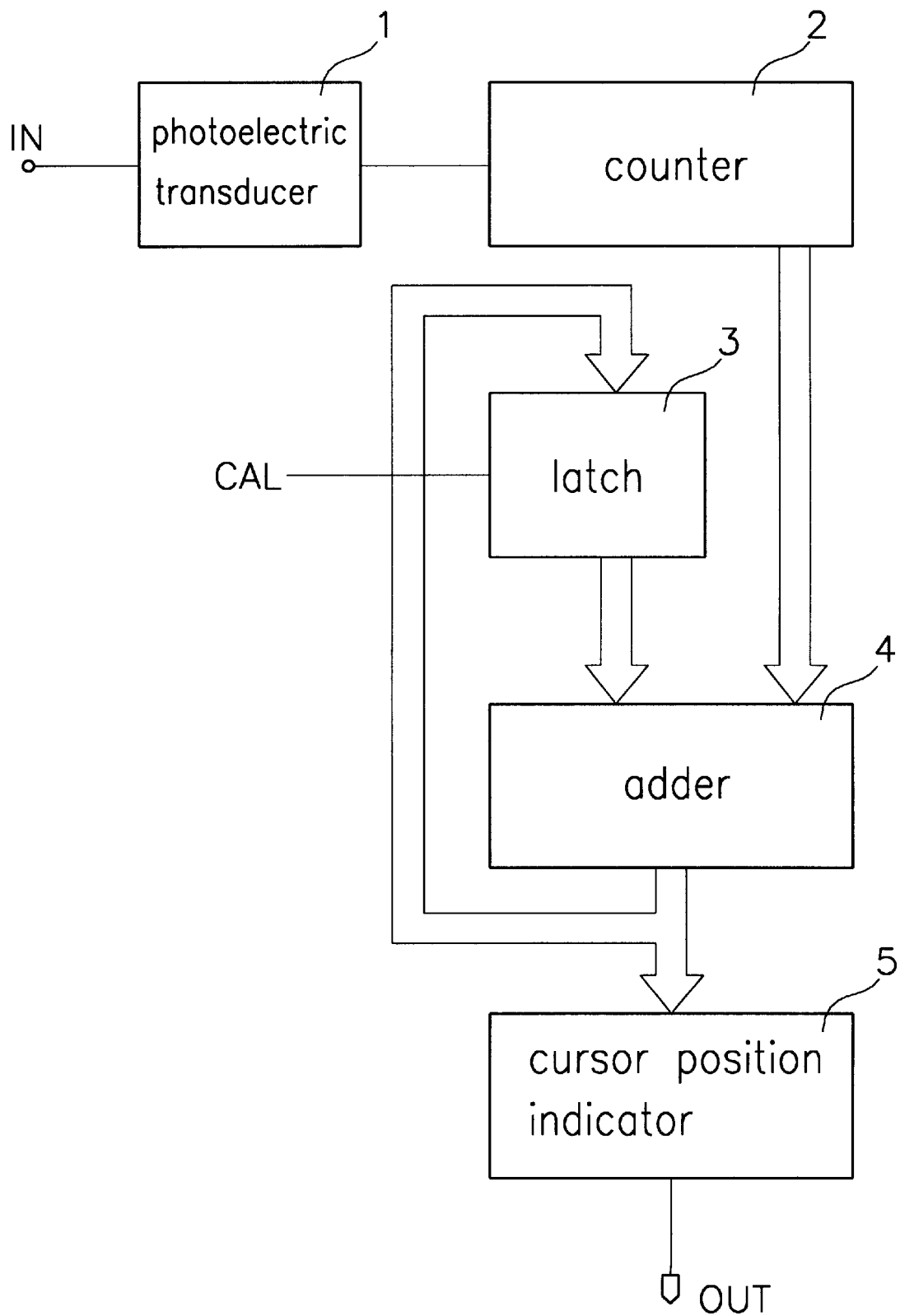
FIG. 1 is a block diagram showing the joystick control device having cursor correcting function in accordance with the present invention.

Referring to FIG. 1 the joystick control device having cursor correcting function according to the preferred embodiment of the present invention includes:

- a photoelectric transducer 1, connecting to the joystick for transforming the light signal corresponding to the movement of the joystick into a one-byte electrical digital signal;
- a counter 2, connecting to the photoelectric transducer 1 for transforming the digital signal (coming from the photoelectric transducer 1) to a bit sequence, wherein the bit sequence represents the movement of the joystick;

a latch 3, having a correction parameter therein and connecting to a feedback signal and a control signal CAL, and selectively inputting the feedback signal to replace the prior correction parameter according to the control signal CAL;

an adder 4, receiving the output parameters from the counter 2 and the latch 3, adding these two parameters, and outputting the result; and a cursor position indicator 5, receiving the parameter from the adder and determining the output parameter which is used for determining the position of the cursor.

The internal circuit of a joystick control device may include an internal parameter drift (e.g. N,); the internal parameter drift N is assumed to act on the cursor position indicator 5 for simplifying the description. At the beginning, a correction parameter −N is stored in the latch 3 for compensating. When an operation is applied to the joystick, the photoelectric transducer 1 transforms the light signal induced by movement of joystick into a single-byte electrical digital signal. Counter 2 receives this digital signal and transforms it into a bit sequence. Adder 4 receives the signals from the counter 2 and the latch 3. Let the parameter outputted from counter 2 is X, the adder 4 outputs a parameter (X+(−N)) to the cursor position indicator 5, and the total output parameter that the cursor position indicator 5 outputs is (X+N+(−N)), which equals to the inputted value X. From the above arrangement, the internal parameter drift of a joystick circuit is compensated. However, as the characters of the joystick control device changes after long-time usage, the internal parameter drift alters from N to M, and the corresponding output parameter of an input X has an incorrect value (X+M+(−N)). Accordingly, resetting the correction parameter inside the latch becomes necessary. For correcting the joystick control device, the joystick is moved to center the cursor reflecting the output parameter on the screen. At this time, the output value from the cursor position indicator 5 equals to zero, that is, (X+M+(−N))=0 and (X+(−N))=−M, in which (X+(−N)) is the parameter outputted from the adder 4. A control signal CAL is inputted to the latch 3 to let the feedback signal (X+(−N)) in for replacing the prior compensation parameter −N, and the new compensation parameter stored in the latch 3 is −M (since (X+(−N))=−M). After this reset operation, the corresponding output parameter of an operation parameter X has a correct value (X+M+(−M))=X.

Figure 2:
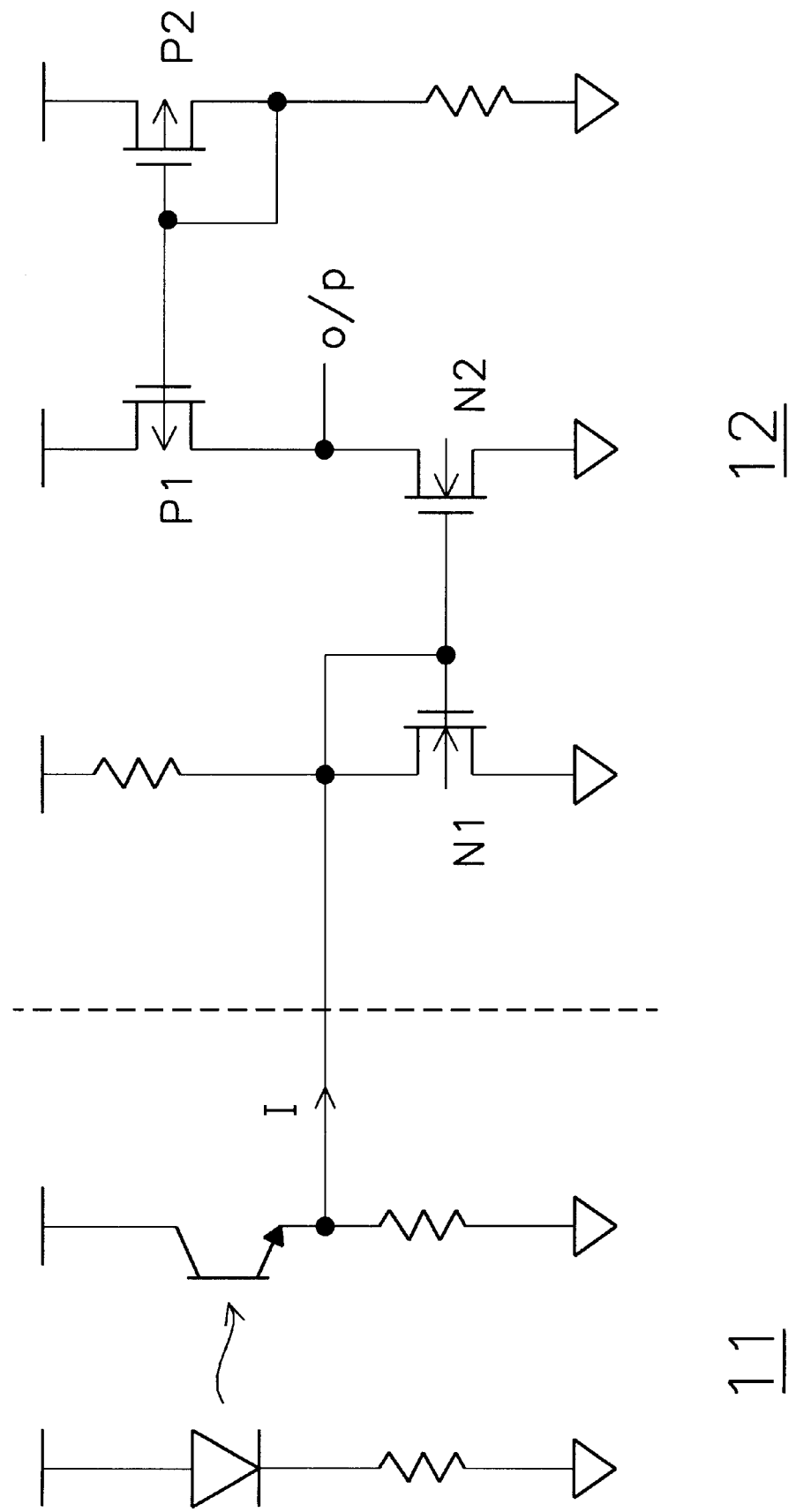
FIG. 2 is a circuit diagram showing a preferred embodiment of the photoelectric transducer 1 of the joystick control device according to the present invention.

Referring now to FIG. 2, the photoelectric transducer 1 according to a preferred embodiment of the present invention includes mainly the photoelectric transistor 11 connecting to the joystick for transforming the light signal into a current signal 1, and the A/D transducer 12 connecting to the output terminal of the photoelectric transistor 11 for transforming the outputted current I into a single-byte digital signal. The potential of the output terminal O/P is substantially the ground potential because of the existence of transistor N2 when the current I is strong enough to let the NMOS transistor connect to N1 and N2. When the current I is unable to let the NMOS transistor connect to N1 and N2, the output terminal O/P is in a float stage and becomes substantially $V_{DD}$ stage because that the PMOS transistor corresponds to P1 and P2. From the above description, it is clear that the A/D transducer 12 has the ability to transform an analogical signal into a digital signal.

Figure 3:
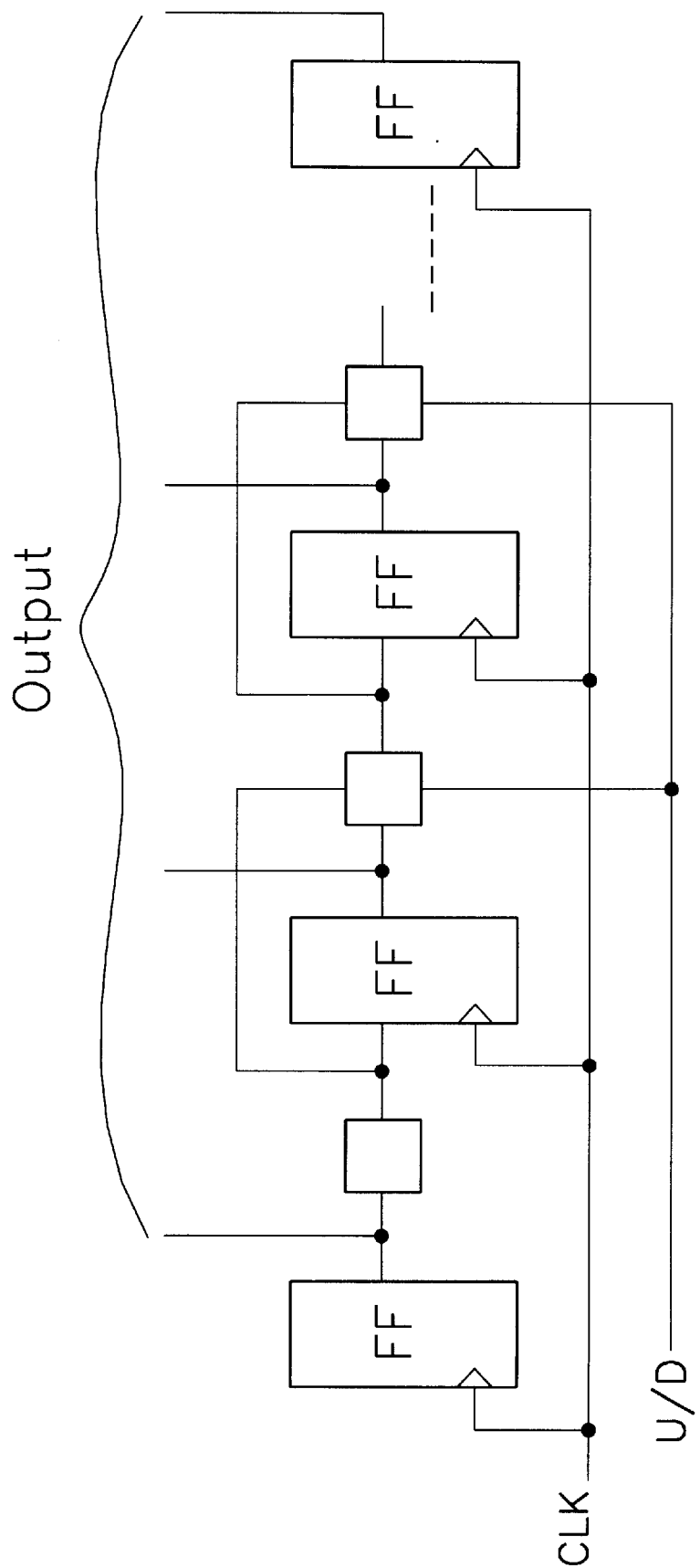
FIG. 3 is a circuit diagram showing a preferred embodiment of the counter 2 of the joystick control device according to the present invention.

FIG. 3 shows a preferred embodiment of the counter 2 according to the present invention. The counter 2 is an UP/DN counter which counts up when the digital signal from photoelectric transducer 1 is high, and counts down when the digital signal from photoelectric transducer 1 is low.

Figure 4:
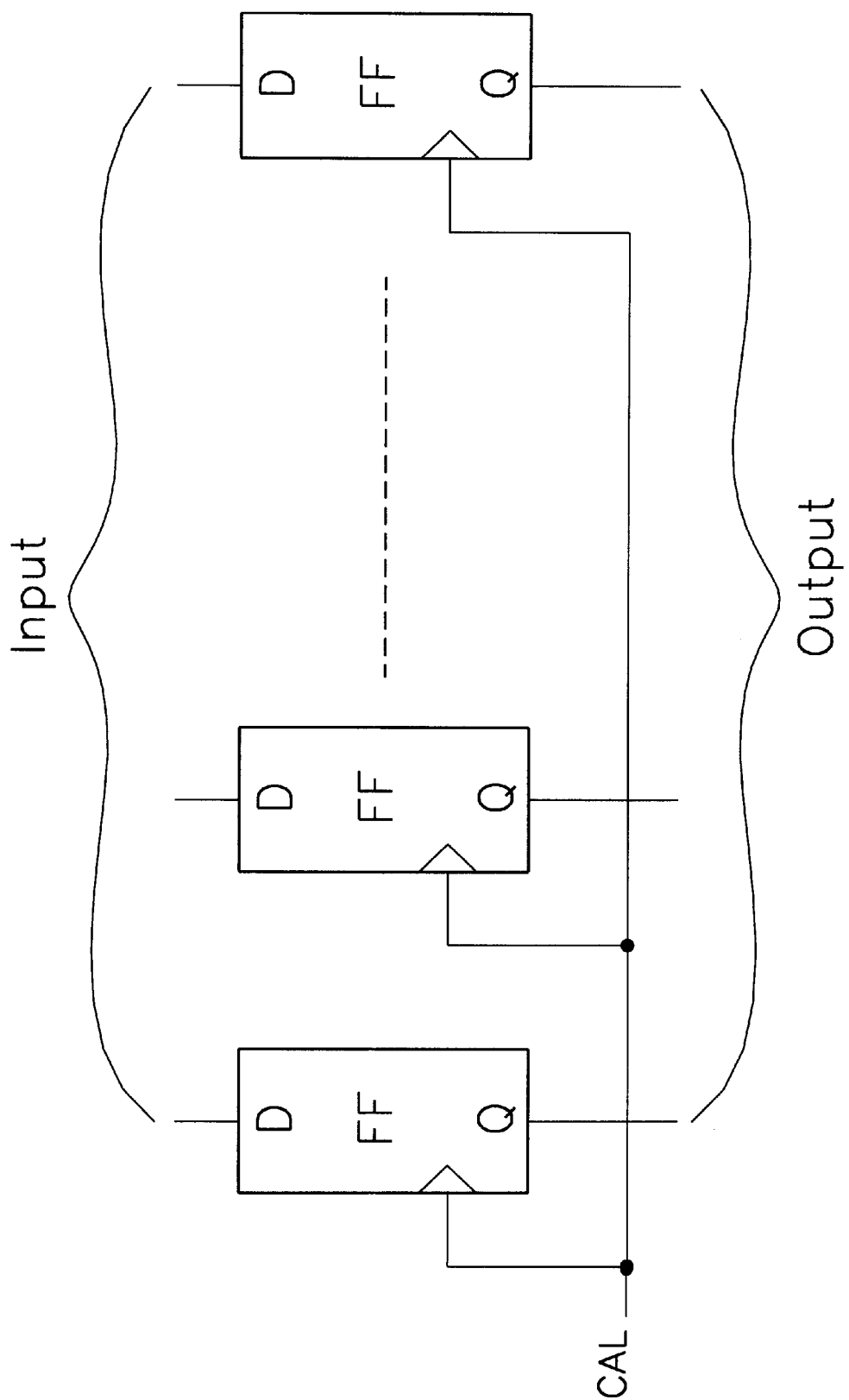
FIG. 4 is a circuit diagram showing a preferred embodiment of the latch 3 of the joystick control device according to the present invention.

FIG. 4 shows a preferred embodiment of the latch 3 according to the present invention. The latch 3 is composed of a plurality of D flip-flops. The control signal CAL is inputted into the CK terminal of each of the D flip-flops, while each bit of the feedback signal coming from the adder 4 is inputted into the D terminal of each of the D flip-flops according to the control signal CAL. The control signal CAL is low during general operation of the joystick control device, and the feedback signal from the adder 4 is prohibited from inputting into the latch 3. When a correction process proceeds, the CAL generates a short-time pulse signal with high-value and returns to low-value immediately. The latch 3 receives a feedback signal from the adder 4 to replace the prior value therein, and the parameter drift caused by the variation of circuit characters can thus be corrected. Because that the parameter drift occurs every time a joystick is turned on and that the parameter drift is conservative before the joystick control device is turned off, the correction process takes place whenever the computer is turned on. However, the correction process can be proceeded whenever the circuit character of a joystick control device changes.

Figure 5:
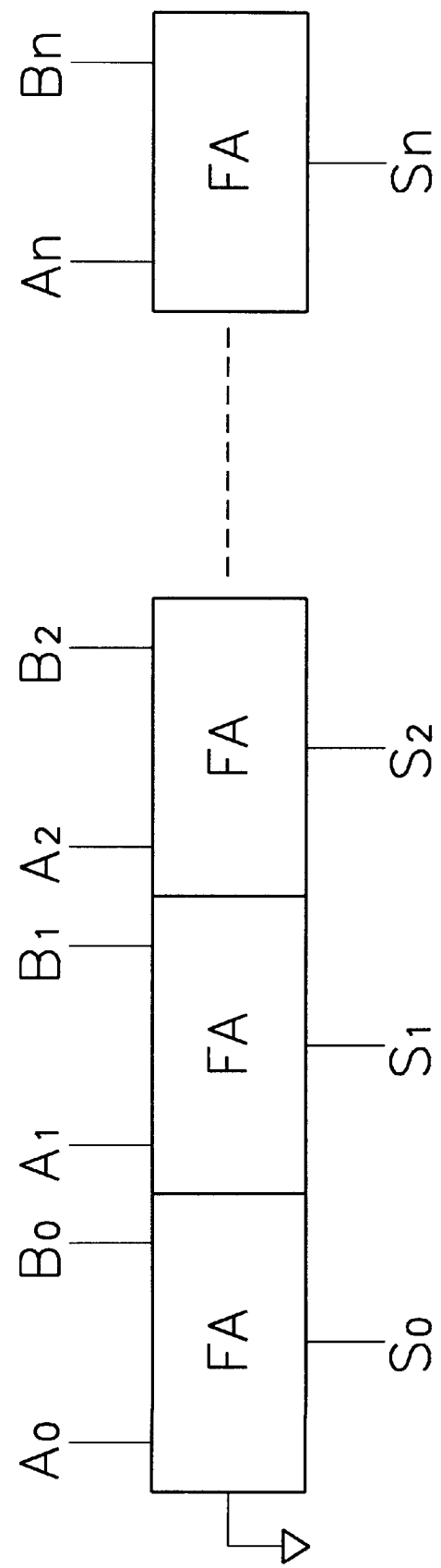
FIG. 5 is a circuit diagram showing a preferred embodiment of the adder 4 of the joystick control device according to the present invention.
Figure 6:
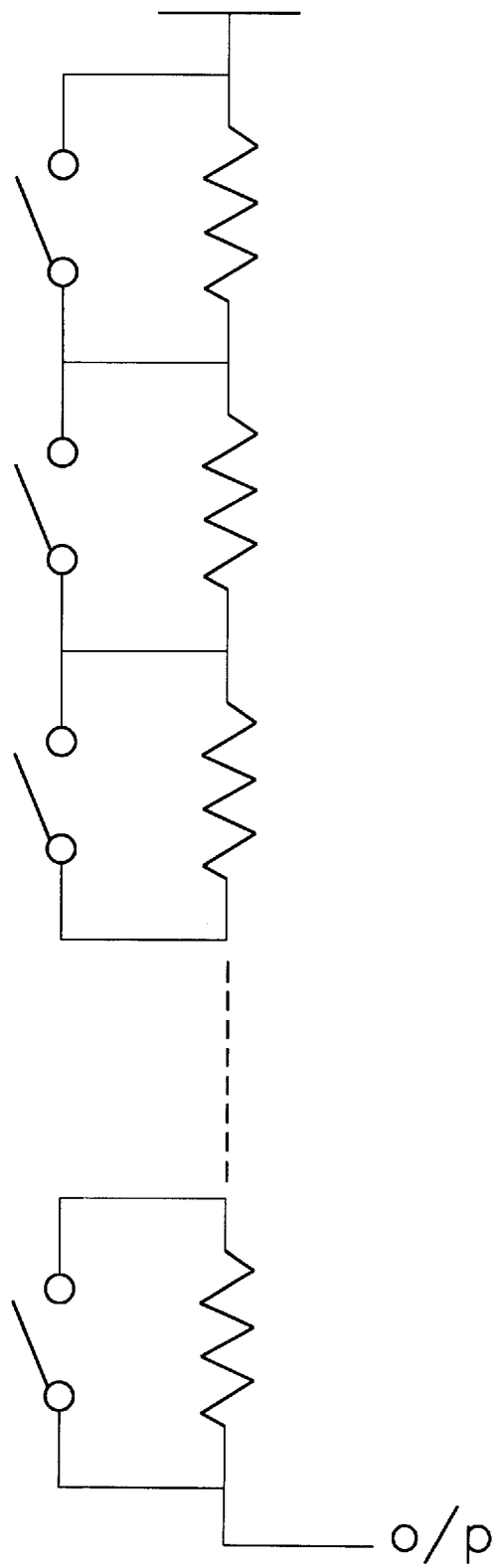
FIG. 6 is a circuit diagram showing a preferred embodiment of the cursor position indicator of the joystick control device according to the present invention.

FIG. 5 shows a preferred embodiment of the adder 4 shown in FIG. 1. The signals $A_0 \sim A_n$ and $B_0 \sim B_n$ coming from the counter 2 and the latch 3 are added by n+1 serial connected full adders FA, and the results $S_0 \sim S_n$ can be obtained.

FIG. 5 shows a preferred embodiment of the cursor position indicator 5 shown in FIG. 1. The output resistance of the cursor position indicator 5 is adjusted according to the signal from adder 4, and the position of the cursor is determined according to the output resistance.

There are two sets of the above-mentioned photoelectric transducer 1, counter 2, latch 3, adder 4, and cursor position indicator 5 for one joystick control device, each of which receives the signal corresponding to the movements of X or Y directions, respectively.

Altogether, the joystick control device having cursor correcting function in accordance with the present invention is corrected by moving the cursor to the center of the screen with joystick every time the joystick is turned on, thereby the cursor sits at the center of the screen when the joystick is centered.

While the present invention has been described with reference to the above preferred embodiment, the description is only illustrative of the present invention and is not to be construed as limiting the invention. Various modifications and applications can be made without departing from the spirit and scope of the present invention as defined by the appended claims.

What is claimed is:

1. A joystick control device having cursor correcting function, comprising:

a photoelectric transducer, connecting to the joystick for transforming the light signal corresponding to the movement of the joystick into an one-byte electric digital signal;

a counter, connecting to said photoelectric transducer for transforming said digital signal coming from said photoelectric transducer into a bit sequence, wherein said bit sequence represents the movement of said joystick;

a latch, having an initial value therein and connecting to a feedback signal and a control signal, and determining whether or not said feedback signal is inputted to replace the prior value in accordance with said control signal;

an adder, receiving the output signals from said counter and said latch, adding said output signals, and outputting the result signal, said result signal being sent back to said latch; and a cursor position indicator, receiving said result signal from said adder, and adjusting the parameter which is used for determining the position of the cursor in accordance with said result signal, said initial value of said latch being used for centering the cursor on the screen when said joystick control device is first turned on, which is determined as follow: said cursor position indicator controlling the cursor to sit at the center of a screen when said initial value is directly inputted into said cursor position indicator; when proceeding the correcting function, said control signal of said latch controlling said feedback signal from said adder to be inputted into said latch for replacing the prior value therein; the value stored within said latch being replaced properly or being conserved till said joystick control device being turned off; the parameter drift of IC caused by manufacturing variation being corrected by shift correction of said joystick whenever said joystick control device is turned on, thereby ensures that the cursor sits at the center of a screen when said joystick is centered.

2. A joystick control device having cursor correcting function as claimed in claim 1, wherein said photoelectric transducer comprises mainly a photoelectric transistor and an A/D transducer, said photoelectric transistor partly connecting to said joystick for transforming a light signal into a current signal, said A/D transducer connecting to the output terminal of said photoelectric transistor for transforming the outputted current into a single-byte digital signal.

3. A joystick control device having cursor correcting function as claimed in claim 1, wherein said counter is an UP/DN counter which counts up when the digital signal from said photoelectric transducer is high and counts down when the digital signal from said photoelectric transducer is low.

4. A joystick control device having cursor correcting function as claimed in claim 1, wherein said latch is composed of a plurality of D flip-flops, said control signal being inputted into the CK terminal of each of said D flip-flops, while each bit of said feedback signal being inputted into the D terminal of each of said D flip-flops; the waveform of said control signal being: the value being low when said joystick control device is turned on, a short- time high value pulse signal being generated during inducing, and then returning to low-value.

5. A joystick control device having cursor correcting function as claimed in claim 1, wherein said cursor position indicator adjusts the output resistance according to the signal from said adder, and the position of the cursor is determined in accordance with said output resistance.

6. A joystick control device having cursor correcting function as claimed in claim 1, comprising two sets of said photoelectric transducer, counter, latch, adder, and cursor position indicator, each set receiving and outputting the signal corresponding to the X or Y direction, respectively.

* * * * *